United States Patent [19]

Armbruster et al.

[11] Patent Number: 4,821,054
[45] Date of Patent: Apr. 11, 1989

[54] FILM PACKET

[75] Inventors: Randy E. Armbruster; Blanchard M. Brock; Timothy L. Bushnell, all of Rochester; Guenter H. Loose, Webster, all of N.Y.

[73] Assignee: Eastman Kodak Company, Rochester, N.Y.

[21] Appl. No.: 200,474

[22] Filed: May 31, 1988

[51] Int. Cl.⁴ .............................................. G03B 17/26
[52] U.S. Cl. .................................................... 354/282
[58] Field of Search ............... 354/276, 277, 278, 279, 354/281, 282, 283, 284, 285, 178, 179; 378/182, 183, 184, 185, 187

[56] References Cited

U.S. PATENT DOCUMENTS

| 689,271 | 12/1901 | Ashford et al. | 354/284 |
|---|---|---|---|
| 729,325 | 5/1903 | Goodwin | 354/178 |
| 791,922 | 6/1905 | Lyon | 354/282 |
| 799,572 | 9/1905 | Lyon | 354/282 |
| 818,543 | 4/1906 | Leistenschneider | 354/282 |
| 824,352 | 6/1906 | Geiger | 354/283 |
| 900,194 | 10/1908 | Niell | 354/284 |
| 1,070,843 | 8/1913 | Price | 354/282 |
| 1,505,000 | 8/1924 | Whiting | 354/282 |
| 3,053,160 | 9/1962 | Bachelder et al. | 354/86 |
| 3,586,501 | 6/1971 | Norquist et al. | 354/85 |
| 3,747,496 | 7/1973 | Bahnsen | 354/282 |
| 4,725,865 | 2/1988 | Hoffman | 354/276 |

FOREIGN PATENT DOCUMENTS

WO8701469 3/1987 PCT Int'l Appl. .
16821 of 1898 United Kingdom .
13038 of 1906 United Kingdom ............... 354/283

Primary Examiner—A. A. Mathews
Attorney, Agent, or Firm—William C. Dixon

[57] ABSTRACT

A packet for daylight-handling of photosensitive film and a cooperating holder mountable on a camera back. The packet has film removably attached to a carrier. The carrier has, at one end, an asymmetrical tab bearing adhesive material and, at its opposite end, a transverse light-locking element. Telescopically receivable over the carrier and film is a light-shielding envelope. The envelope has an open end that is closable by engagement with the light-locking element and a closed end with a sealing area that overlies and, when grasped, adheres to the tab, to prevent inadvertent separation of the envelope from the carrier. An adjacent area, not overlying the tab, is graspable for pulling the sealing area free of the tab and the envelope away from the film, to permit intended exposure. The envelope also has, near its open end, a stop strip for limiting envelope movement. The packet is slidably insertable into, and withdrawable from, the cooperating holder, which includes a spring-loaded pressure-applying member for maintaining the film in an exposure plane, a spring-loaded latching member engageable with the light-locking element to retain the carrier in place, a spring-loaded blocking member engageable with the stop strip to limit envelope movement while the carrier is retained, and a releasing member that is manually actuable for negating the spring-loadings on the pressure-applying, latching, and blocking members, to permit unrestricted withdrawal of the packet from the holder.

14 Claims, 10 Drawing Sheets

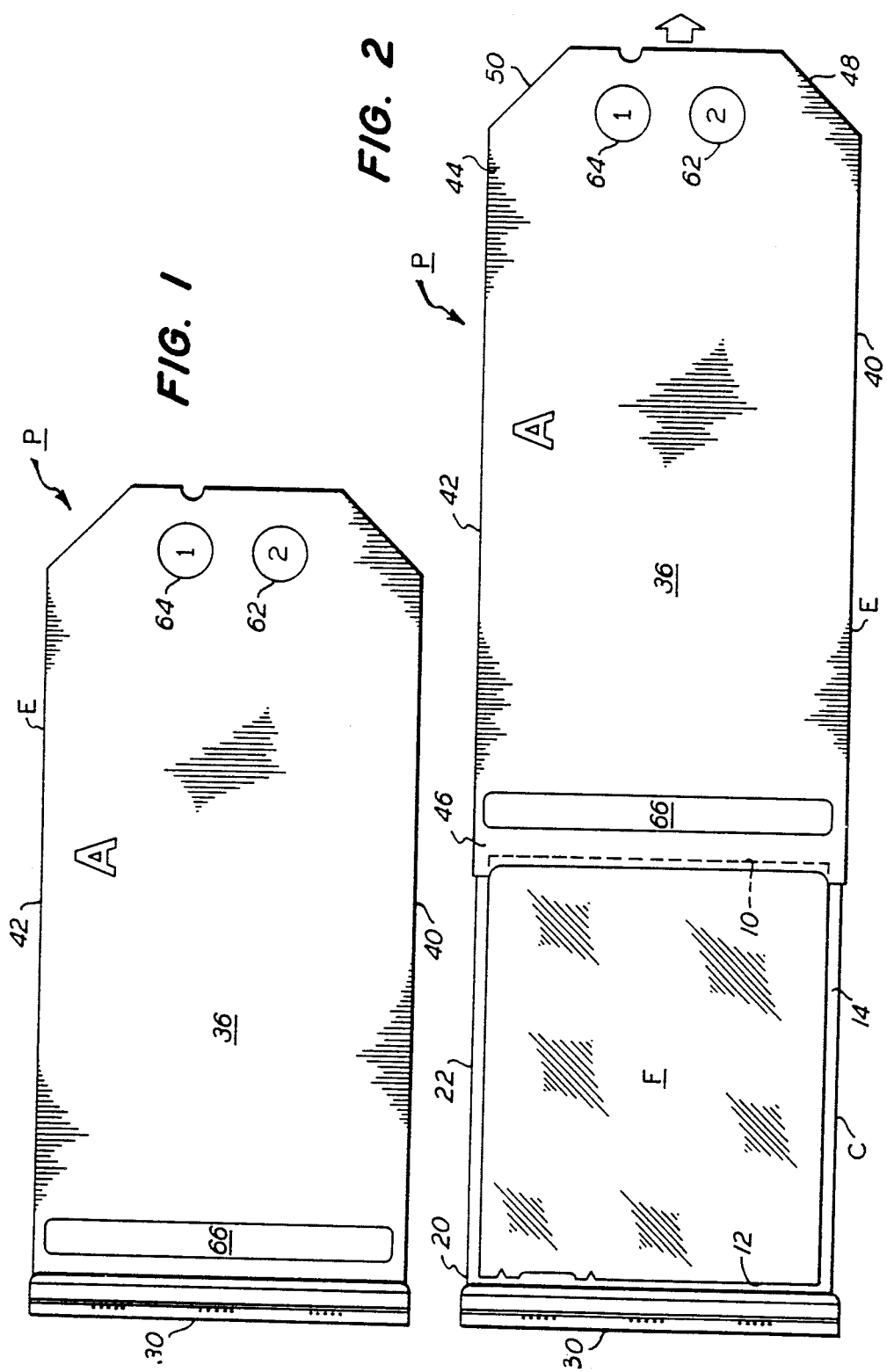

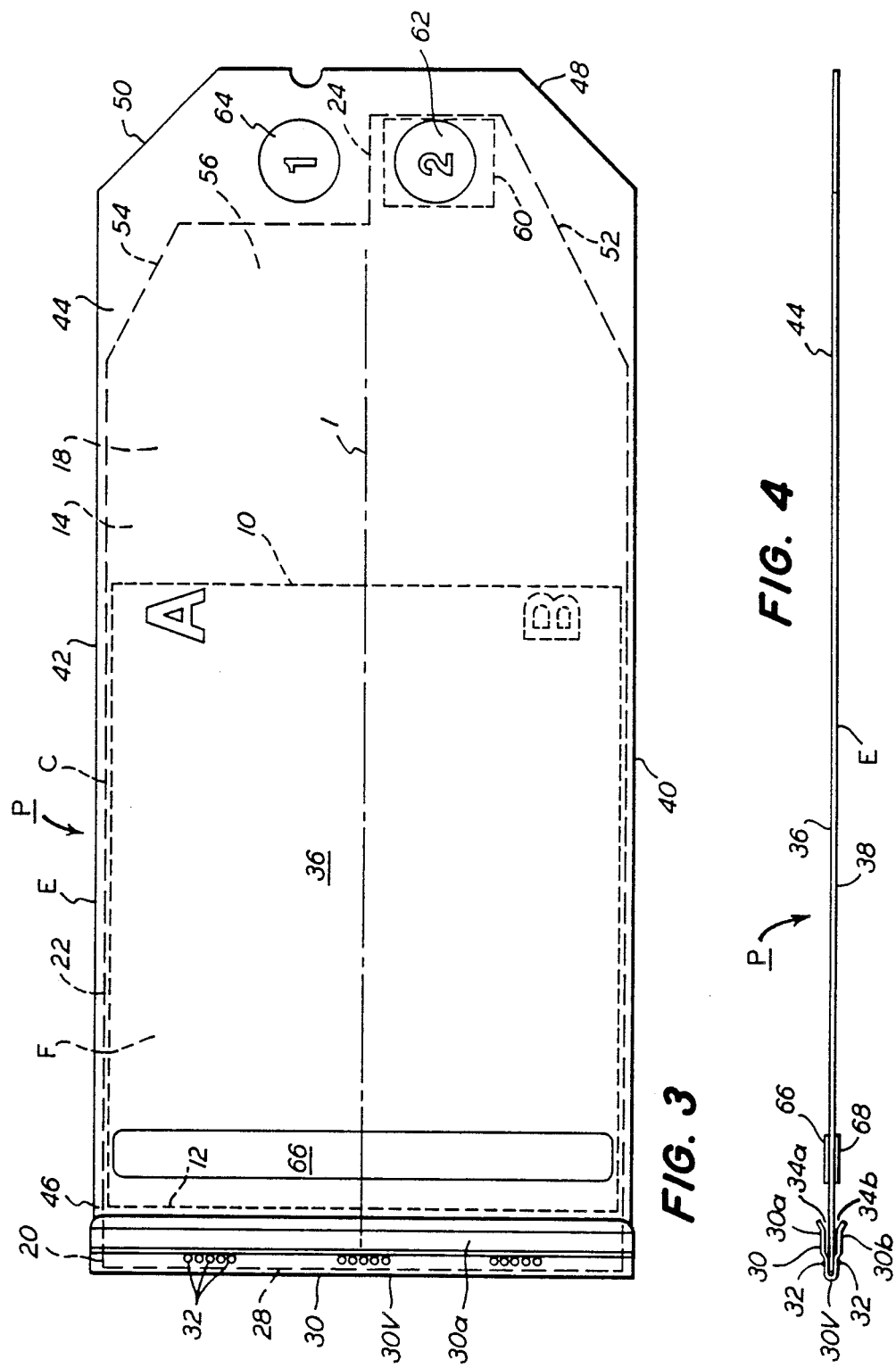

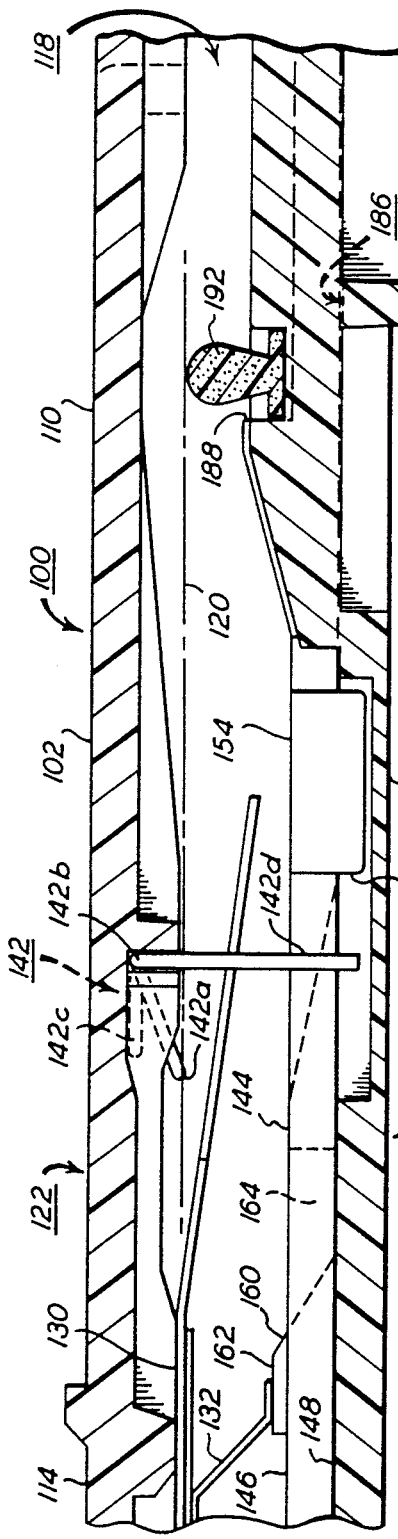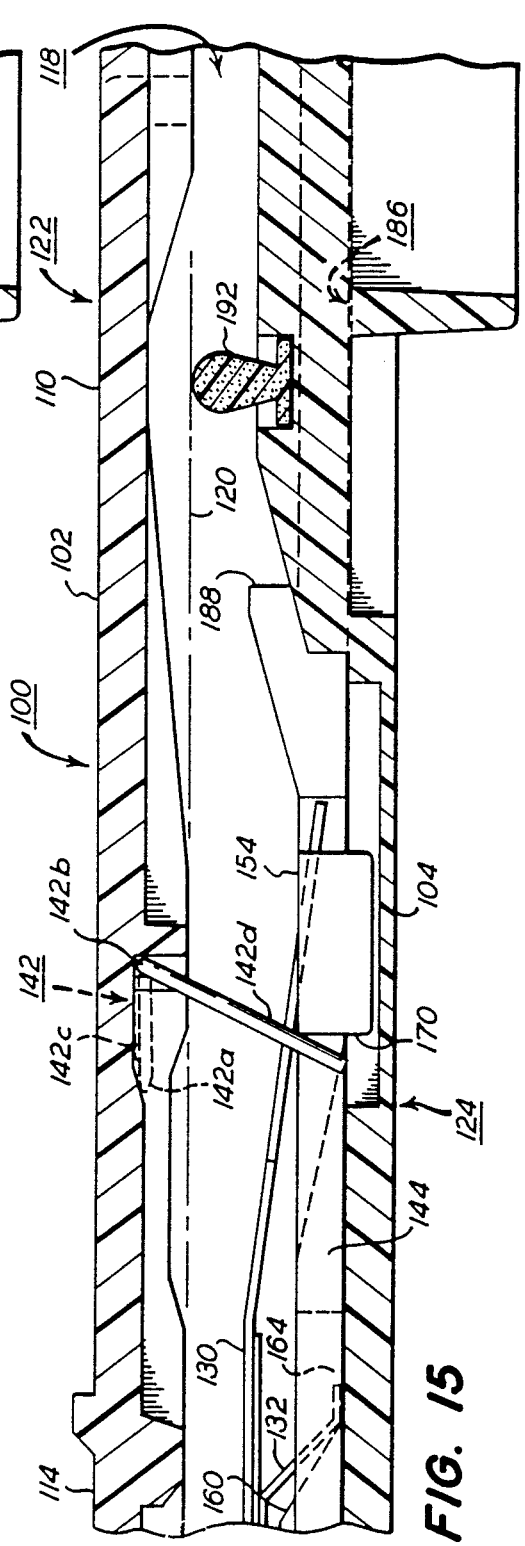

FILM PACKET

BACKGROUND OF THE INVENTION

1. Field of the Invention

The present invention relates generally to film assemblages, and particularly to such assemblages that provide for daylight-handling of one or more photosensitive film sheets therein in conjunction with a compatible film holder that is mountable on a photographic camera back.

2. Description of the Prior Art

The prior art is replete with film assemblages of the type referred to above. Examples may be found in the following documents:

U.S. Pat. No. 818,543 - Discloses a photographic holder (g) in use with an assemblage comprising a film sheet (a) mounted on a carrier (b) and light-tightly enclosed by a withdrawable envelope (f); the assemblage has a manually graspable end portion extending outside the holder, where a medial part, but not the two lateral parts, of the enclosed carrier end is cut back to permit (by selective grasping) withdrawal of either the envelope alone or the whole assemblage.

U.S. Pat. No. 3,586,501 - Discloses a self-processable film assemblage (10) in use with a film holder (32), the assemblage comprising a photosensitive film sheet (26) having at one end a transversely disposed "clip" (20) for closing a mating open end (12a) of a light-excluding envelope (12) telescopically received over the film sheet, the clip being adapted for selective engagement and disengagement by a latch (42) in the holder to prevent and permit, respectively, film sheet movement with the envelope when an externally accessible closed end (12b) thereof is pulled away from the holder, the closed end (12b) terminating in a pair of laterally offset graspable tabs (22, 24) extending respectively from opposing walls (14, 16) of the envelope, the film sheet (26) having a leader (50) extending therefrom toward the envelope closed end (12b) with a recessed end portion (50a) provided to allow only the envelope to be grasped and pulled from the holder, the envelope also having a stop-strip (46) transversely disposed thereon near its open end (12a) and engageable by another latch (48) in the holder to limit outward movement of the envelope.

International Patent Publication No. WO 87/01469 - Discloses a photographic film assemblage (1a) usable with a cooperating film holder (47), the assemblage comprising a carrier (1) having twin film sheets (2) removably mounted on opposite faces of a film-carrying region (3) thereof, with an elongate, narrow tab portion (6) extending longitudinally from one end of the film-carrying region and a rigid, light-sealing "clip" (8) disposed transversely over both carrier faces at the opposite end, together with a light-excluding envelope (14) having an open end (15) that is telescopically slidable over the carrier and film sheets into light-sealing engagement with the clip and a closed end (20) that both conformably encloses and extends beyond the carrier tab portion (6), so that (by selective grasping) either the envelope alone may be pulled away from the carrier and film sheets or the whole assemblage may be pulled together, the clip (8) being engageable by a cooperating tab (43) in the holder to prevent the carrier and film sheets from moving when only the envelope is to be withdrawn, the envelope also having a pair of stop-strips (14a) disposed transversely on both walls thereof near its open end (15), and engageable with a cooperating stop (43a) in the holder, to limit the extent of envelope withdrawal when either film sheet is to be exposed.

While such assemblages may have proven useful for their respective purposes, there has remained a need for an improved film assemblage so constructed and configured that a film sheet therein cannot inadvertently be exposed by unintended relative movement between its light-excluding parts, especially during handling and transport of the assemblage either before or after intended exposure in associated photographic apparatus.

SUMMARY OF THE INVENTION

Accordingly, a primary object of this invention is to meet the foregoing need for such an improved film assemblage. Another object is to do so in an effective, yet economical and convenient, manner. Those and other objects have been achieved by the invention herein claimed.

This invention finds utility in a photographic film assemblage comprising a photosensitive film sheet having leading and trailing ends and an elongate carrier sheet having first and second outward-facing surfaces, the carrier sheet including leading and trailing end sections and an intermediate section between the end sections. The film sheet is detachably attached to the first outward-facing surface of the intermediate section with its leading and trailing ends oriented toward the leading and trailing end sections respectively. The leading end section extends longitudinally beyond the intermediate section and terminates in a tab. The trailing end section extends longitudinally beyond the intermediate section and has a transversely disposed element secured thereto. Removably enclosing both the film sheet and the carrier sheet is a light-shielding envelope having first and second inward-facing surfaces overlying the first and second outward-facing surfaces respectively, the envelope including longitudinally extending leading and trailing end portions overlying the leading and trailing end sections respectively. The leading end portion is sealed closed, while the trailing end portion is closable by cooperative engagement with the transversely disposed element. The leading end portion includes first and second graspable zones. The first such zone overlies the tab, so that when grasped the first zone is pressed against the tab. The second graspable zone does not overlie the tab, so that when grasped the second zone is not pressed thereagainst. Either the tab or the first graspable zone has adhesive material thereon, so that when grasped the first zone becomes adhered via the adhesive material to the tab, thereby preventing unintended relative movement between the envelope and the carrier sheet.

In the preferred embodiment of this invention as described and illustrated herein, the assemblage also comprises a second photosensitive film sheet, detachably attached to the second outward-facing surface of the intermediate section. Each of the first and second film sheets is so attached to an intermediate-section outward-facing surface at only one of its leading and trailing ends, in order to facilitate detaching each film sheet from the carrier sheet; and the preferred one of those ends for each film sheet is its leading end, to facilitate inserting the carrier sheet and attached film sheets into the envelope.

This invention, and its objects and advantages, will become more apparent in the detailed description of the preferred embodiment thereof presented hereinbelow.

BRIEF DESCRIPTION OF THE DRAWINGS

In the detailed description of the preferred embodiment of this invention presented below, reference is made to the accompanying drawings, wherein like reference numerals denote like elements, and wherein:

FIG. 1 is a top-plan view of a photographic film assemblage, or film packet, constructed and configured in accordance with the preferred embodiment of this invention, showing the packet in its fully assembled and closed condition;

FIG. 2 is a top-plan view of the film packet depicted in FIG. 1, showing a light-shielding envelope thereof as withdrawn from a photosensitive film sheet therein;

FIG. 3 is an enlarged top-plan view of the film packet of FIG. 1 in its fully assembled and closed condition, showing (via broken lines) the photosensitive film sheet and a carrier sheet therefor as hidden within the light-shielding envelope;

FIG. 4 is an elevational view of the film packet of FIG. 3;

FIGS. 14 and 15 are partial cross-sectional elevations showing another region of the film holder as taken along line 14/15—14/15 in FIG. 8, FIG. 14 depicting operative components disposed in respective rest positions, FIG. 15 illustrating those components as moved to their actuated positions wherein a film packet (not shown) may be removed from the holder.

DESCRIPTION OF THE PREFERRED EMBODIMENT

Because certain parts of photographic film assemblages and holders therefor are well known, the following description is directed in particular to those elements forming, cooperating directly with, or relating to, this invention. Elements not specifically shown or described herein are selectable from those known in the relevant art.

Figure 5:
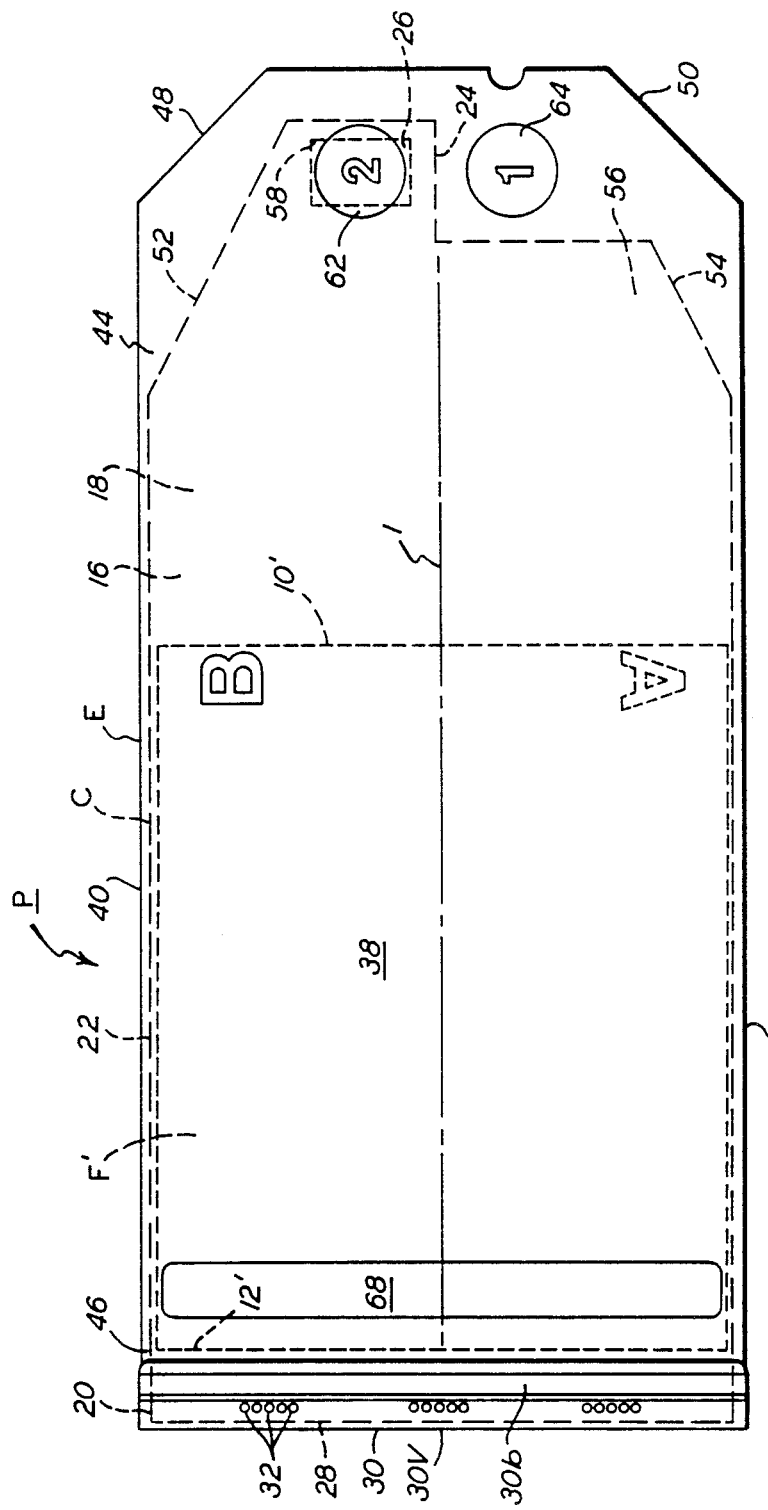
FIG. 5 is an enlarged bottom-plan view similar to FIG. 3 but showing (via broken lines) a second photosensitive film sheet on the other side of the carrier sheet.

FIGS. 1-7 illustrate a photographic film assemblage, or film packet, constructed and configured according to the preferred embodiment of this invention. FIGS. 1, 3, and 5 present plan views of such a packet, designated generally therein by the letter P, as it appears when in its fully assembled and closed condition.

FIG. 1 shows only the exteriorly visible components of packet P, as viewed from a first side thereof, including a light-shielding envelope E made of cardboard or other opaque material. As illustrated in FIG. 2, envelope E removably encloses a photosensitive film sheet F having leading and trailing ends 10 and 12, respectively, and an elongate carrier sheet C, to which film sheet F is detachably attached for facilitating use of the film sheet.

FIGS. 3 and 5 present, respectively, top-plan and bottom-plan views of packet P, FIG. 3 showing the first side thereof seen in FIG. 1, FIG. 5 showing the opposite, or second, side. It will thus be seen in FIGS. 3 and 5 that carrier sheet C (shown in broken lines) has first and second outward-facing surfaces 14 and 16 respectively. The carrier sheet includes leading and trailing end sections 18 and 20, respectively, and an intermediate section 22 between the two end sections. As seen in FIG. 3, film sheet F is detachably attached to the first outward-facing surface 14 of intermediate section 22, with its leading and trailing ends 10 and 12 respectively oriented toward the leading and trailing end sections 18 and 20. Similarly, as seen in FIG. 5, a second photosensitive film sheet F' is detachably attached to the second outward-facing surface 16 of intermediate section 22, with its leading and trailing ends 10' and 12' respectively oriented toward leading and trailing end sections 18 and 20.

Leading end section 18 extends longitudinally beyond intermediate section 22 (to the right, as viewed in FIGS. 3 and 5) and terminates in a tab 24 projecting therefrom as shown. Trailing end section 20 extends longitudinally beyond intermediate section 22 (to the left, as viewed in FIGS. 3 and 5) and includes a transverse edge 28, along which is secured a transversely disposed light-locking element 30. Element 30 may be secured to end section 20 by crimping it thereto, as illustrated by the three series of dimples 32 extending parallel with, and adjacent to, edge 28.

As shown in FIG. 4 (which presents an end view of element 30), the light-locking element is generally V-shaped in cross section, having a vertex 30v with diverging first and second flange portions 30a and 30b projecting angularly therefrom over the first and second outward-facing surfaces 14 and 16, respectively, of end section 20. When so placed, element 30 provides first and second recesses 34a and 34b disposed, respectively, between flange portions 30a and 30b and the outward-facing surfaces 14 and 16 of end section 20.

Light-shielding envelope E comprises first and second opposing walls 36 and 38, respectively, which are joined along their lateral edges 40 and 42 to provide a sleeve-like enclosure for receiving the carrier sheet and attached film sheets. The opposing interior surfaces of walls 36 and 38 comprise first and second inward-facing surfaces 36' and 38' that respectively overlie the first and second outward-facing surfaces 14 and 16 of carrier sheet C when received therebetween.

The envelope further includes longitudinally extending leading and trailing end portions 44 and 46 that respectively overlie the leading and trailing end sections 18 and 20 of the carrier sheet. Leading end portion 44 is sealed closed along its outer edges, and its corners are beveled as shown at 48 and 50. Trailing end portion 46 by itself is left open to permit insertion and withdrawal of the carrier sheet and film sheets therethrough; but when those sheets are fully inserted as shown in FIGS. 1 and 3–5, end portion 46 is closed by entry thereof into recesses 34a and 34b and compressive engagement with flange portions 30a and 30b of light-locking element 30.

To facilitate insertion of the carrier and film sheets through end portion 46 and fully into the envelope, the carrier sheet leading end section is beveled as shown at 52 and 54, and the two film sheets F and F' are detachably attached to the carrier sheet at their leading ends 10 and 10'. Also, to facilitate detaching the film sheets from the carrier sheet after withdrawal from the envelope, each film sheet is detachably attached only at its leading end, so that its trailing end and image area can be easily lifted from the carrier sheet and its leading end then peeled off.

Figure 6:
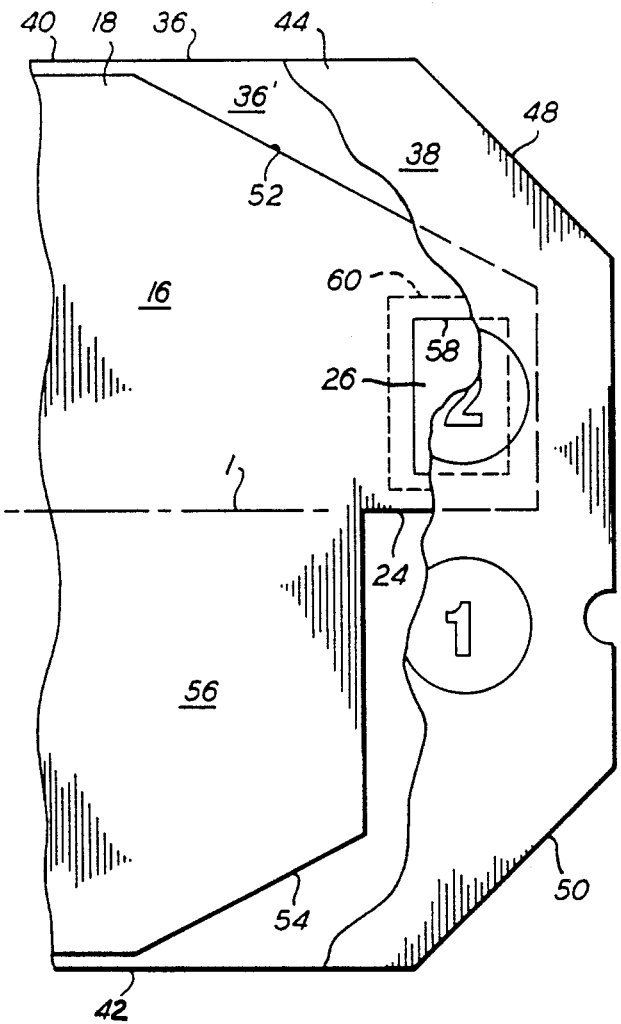
FIG. 6 is an enlarged partial view of the film packet as depicted in FIG. 5, with the light-shielding envelope broken away to reveal a leading end section of the carrier sheet therewithin.
Figure 7:
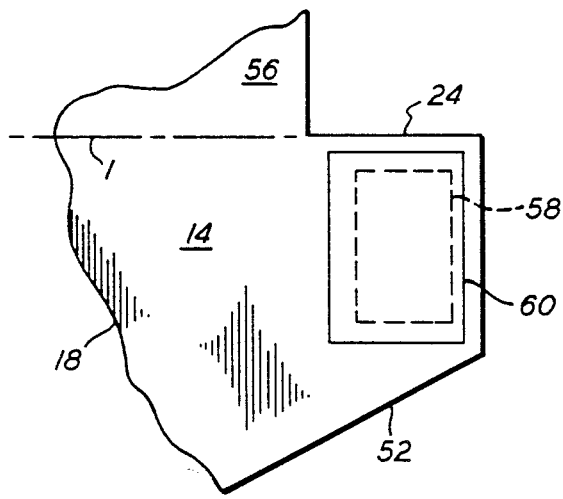
FIG. 7 is an enlarged partial top-plan view of the leading end section of the carrier sheet, showing details of a tab portion thereof.
Figure 8:
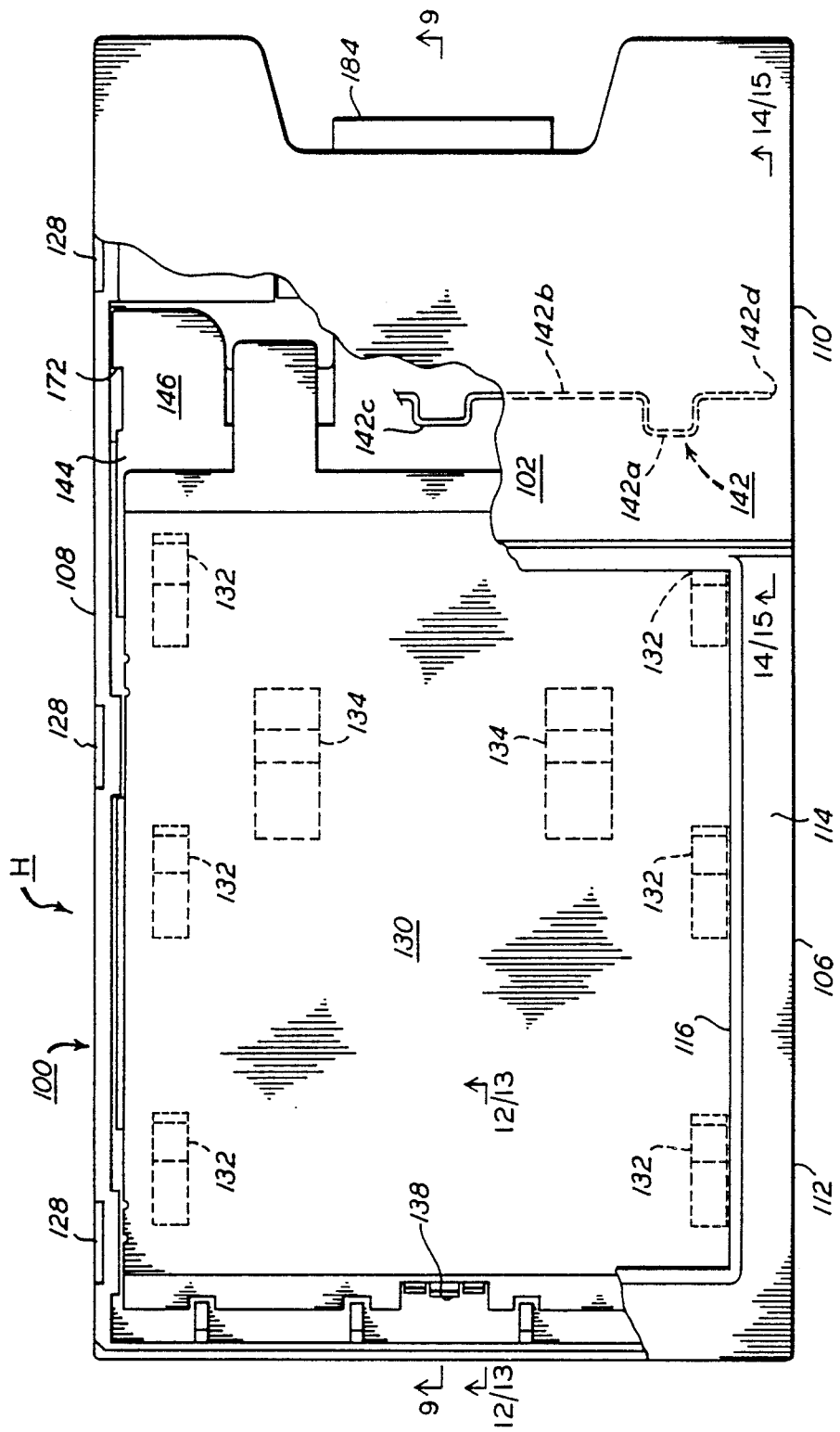
FIG. 8 is a top-plan view of a photographic film holder adapted for use with the film packet of FIGS. 1-7 on a cooperating camera back, with portions shown broken away for clarity of illustration.

It will be seen in FIGS. 3, 5, and 6 that the tab 24 on carrier sheet leading end section 18 is eccentrically disposed, relative to the carrier sheet longitudinal center line 1, and that it extends farther from intermediate section 22 than does any other portion of leading end section 18. That is to say, the leading end section 18 extends asymmetrically relative to center line 1 such that it has a longer portion, including tab 24, disposed at one side of the center line and a shorter portion 56, not including tab 24, at the other side of said line.

As illustrated in FIGS. 3 and 5–7, tab 24 includes a rectangular aperture 58 cut through it and a larger rectangular piece of tape 60 having an adhesive surface 26 placed across the aperture with marginal portions thereof adhered to surrounding portions of the tab. Although tape 60 is shown as adhered to first outward-facing surface 14 of the tab, so that its adhesive surface 26 overlying aperture 58 faces an opposing area of second inward-facing surface 38' of envelope second wall 38, the tape could instead be adhered to second outward-facing surface 16 of the tab, so that its adhesive surface overlying the aperture would then face an opposing area of first inward-facing surface 36' of envelope first wall 36. Also the aperture and/or the tape could be other than rectangular in shape for the purposes of this invention.

Referring now to FIGS. 3 and 5, the envelope leading end portion 44 comprises first and second graspable zones 62 and 64, respectively, which are transversely aligned with each other. It will be seen that the first graspable zone 62 overlies both the tab aperture 58 and the tape 60 placed thereacross. When grasped, first zone 62 thus becomes adhered, via the tape adhesive surface 26, to the tab, thereby preventing unintended relative movement between the envelope and the carrier sheet. It will also be noted that the second graspable zone 64 does not overlie tab 24 at all. Instead it overlies a region inside the envelope that is transversely spaced from the tab and longitudinally spaced from the leading end section shorter portion 56, i.e., it overlies no part of the leading end section. Consequently, when grasped, the second zone 64 does not become adhered to anything, and relative movement between the envelope and the carrier sheet is therefore not prevented.

An alternative embodiment of this invention (not shown) would have the aperture located, not in tab 24, but in the first graspable zone 62 of either envelope wall 36 or 38, with the tape then placed on the exterior surface of that wall over the aperture so that its adhesive surface faces the tab thereunder. Grasping zone 62 would thus produce the same result as that described above.

Another alternative embodiment (not shown) would have no aperture at all, but instead would have either double-sided adhesive tape or some other adhesive material applied either to one of the outward-facing surfaces 14, 16 of the tab or to one of the inward-facing surfaces 36', 38' of the envelope at first graspable zone 62. Here too, the result would be the same.

As shown in FIGS. 1–5, the envelope first and second walls 36 and 38 have a pair of movement-limiting elements, or stop strips, 66 and 68 transversely disposed on their exterior surfaces near the envelope trailing end portion 46. Strips 66 and 68 may be made of cardboard or plastic and adhered or sealed to their respective envelope wall surfaces. Their thickness or height above those surfaces must be sufficient to be readily engageable by one or more cooperating members in a compatible film packet holder such as that describe below.

FIGS. 8–15 illustrate a photographic film packet holder H adapted for use with the film packet P, described above, on a cooperating camera back (not shown). The holder H comprises a substantially rectangular-shaped housing 100 having parallel, spaced-apart front and rear walls 102 and 104 respectively, opposing sides 106 and 108, and oppositely disposed first and second end regions 110 and 112 respectively.

The front wall 102 includes a frame portion 114 defining a film-exposure window 116. The first end region 110 includes an access opening 118 configured to permit ingress and egress of film packet P along a movement path 120 extending to and from, respectively, a seated position wherein the packet film sheets F and F' are aligned with window 116 and the packet light-locking element 30 is located in second end region 112.

Figure 9:
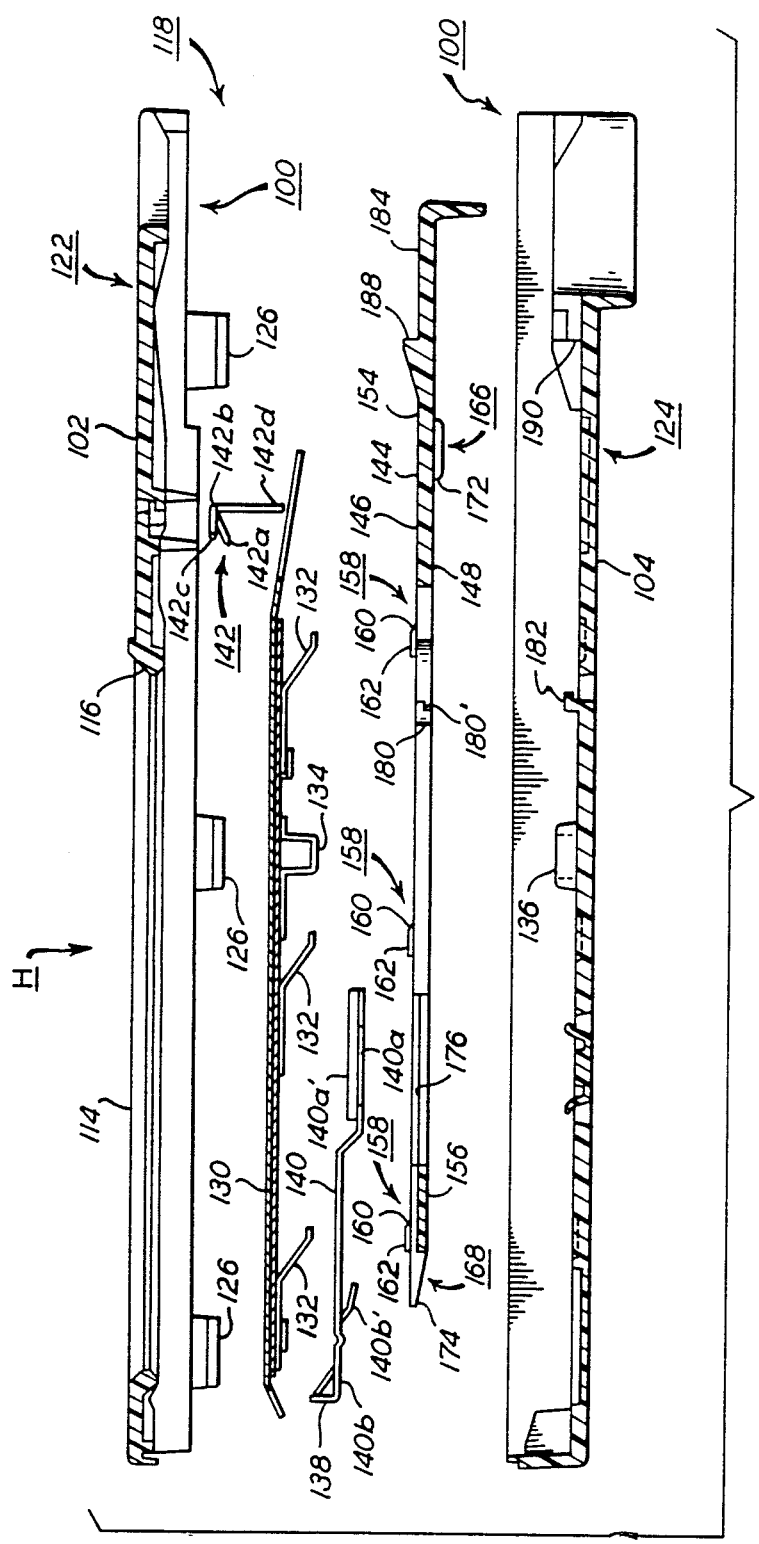
FIG. 9 is a cross-sectional elevation of the film holder of FIG. 8, taken along line 9—9 therein, showing its principal components in exploded form.

As shown most clearly in FIG. 9, housing 100 comprises separately formed front and rear components 122 and 124 which include the front and rear walls 102 and 104 respectively, the two components being light-tightly fitted together with access opening 118 and movement path 120 disposed therebetween. Preferably, each of the front and rear components 122 and 124 is an integral molded plastic piece; and such components include matable interlocking means for snap-fitting them together. Such means are shown as comprising a plurality of resiliently flexible latching fingers 126, which depend from front wall 102 along both sides of front component 122, and a like plurality of mating channels 128 correspondingly located in both side walls of rear component 124.

Inside housing 100, in housing rear component 124, is a substantially flat pressure-applying member, or plate, 130 movably disposed between and substantially parallel with the housing front and rear walls 102 and 104. Plate 130 is movable in directions transverse to the front wall and is normally urged, by influence of biasing means thereon, toward movement path 120 so as to press the film packet, when in its seated position, against the front wall frame portion 114. Biasing means for so urging the pressure-applying plate is shown as comprising a plurality of spring elements 132 depending angularly from the plate toward rear wall 104. To guide movement of plate 130 in directions transverse to front wall 102, and to locate the plate and restrain it from moving in directions parallel with that wall, a pair of guide elements 134 also depend from the plate toward rear wall 104. Guide elements 134 are configured to fit slidably into a pair of correspondingly located hollow bosses 136 that project from rear wall 104 toward the plate.

Also in housing rear component 124 is a first blocking member 138, movably disposed in the housing second end region 112. Blocking member 138 also is movable in directions transverse to the front wall; and it too is normally urged by influence of biasing means thereon toward movement path 120, but in this case to engage the packet light-locking element 30, when the packet is in its seated position, to thereby block movement of element 30 toward access opening 118. Biasing means for so urging blocking member 138 is depicted as comprising a cantilever spring element 140 having a fixed end portion 140a secured to rear wall 104 and a movable free end portion 140b resiliently supporting member 138. Fixed end portion 140a includes a pair of flanges 140a' extending laterally therefrom in spaced parallel relation to rear wall 104. Free end portion 140b is bifurcated as shown to provide a pair of engageable legs 140b' depending angularly therefrom toward rear wall 104.

Movably mounted on housing front component 122, between front wall frame portion 114 and access opening 118, is a second blocking member 142. Blocking member 142 also is movable in directions transverse to front wall 102; and it too is normally urged by influence of biasing means thereon toward movement path 120, but in this case to engage the packet envelope movement-limiting element (stop strip 66 or 68) then facing the front wall during movement thereof from its seated position toward the access opening, to thereby block further movement thereof toward the opening. Blocking member 142 comprises a pair of U-shaped blocking elements 142a (one shown) which have been formed as projecting parts of a transversely disposed torsion spring 142b. Torsion spring 142b has a U-shaped central portion 142c fixed to front wall 102, and it terminates in a pair of movable spring legs 142d which are formed at its opposite ends to depend from the front wall and extend toward rear wall 104. Such constituent parts of the torsion spring thus provide both the blocking member itself (elements 142a) and the biasing means (fixed portion 142c and movable legs 142d) normally urging it toward the movement path.

Slidably mounted in housing rear component 124, between plate 130 and rear wall 104, is a releasing member, or slider, 144, which preferably is formed as an integral molded plastic piece. Slider 144 is movable in first and second opposing directions extending toward the first and second end regions 110 and 112 respectively. The slider is normally urged, by influence of biasing means thereon, in the first direction to a rest position (shown in FIG. 10), and is adapted for manual movement in the second direction away from that position (see arrow in FIG. 11).

Slider 144 is provided with means, operatively associated with plate 130 and blocking members 138 and 142, and responsive to said manual movement in the second direction, for negating the aforementioned biasing means influences that normally urge plate 130 and members 138 and 142 toward movement path 120, so as to remove the plate and both blocking members from said path and thereby release the film packet for unrestricted movement therealong from its seated position and out through the access opening.

The slider has front and rear surfaces 146 and 148 facing plate 130 and rear wall 104 respectively, lateral portions 150 and 152 that extend along housing sides 106 and 108 respectively, and first and second end portions 154 and 156 directed toward the first and second end regions 110 and 112 respectively.

The slider negating means, mentioned above, comprises camming means 158 on front surface 146, including a plurality of ramps 160 in lateral portions 150 and 152 and a like plurality of projections 162 and depressions 164 respectively disposed at opposite ends of the ramps. The front surface camming means 158 interacts with the spring elements 132 that depend angularly from plate 130, to control their biasing influence on the plate.

The slider negating means further comprises camming means 166 and 168 in first and second end portions 154 and 156, respectively, which interact with second blocking member spring legs 142d and first blocking member spring legs 140b', respectively, to control their respective biasing influences on the second and first blocking members. The first end portion camming means 166 includes a pair of laterally projecting ears 170 and 172 respectively disposed in lateral portions 150 and 152 adjacent to housing sides 106 and 108, in engageable relation with spring legs 142d. The second end portion camming means 168 includes a tapered tab 174 that is bifurcated to provide a pair of tapered tab portions 174' which project longitudinally toward blocking member 138 for symmetrical engagement with spring legs 140b' about their common longitudinal center line.

To guide longitudinal movement of slider 144 in its first and second directions, and to locate the slider and restrain it from moving in other directions, a pair of recessed sections 176 are provided to fit slidably between the laterally extending flanges 140a' and opposing areas of rear wall 104.

Figure 10:
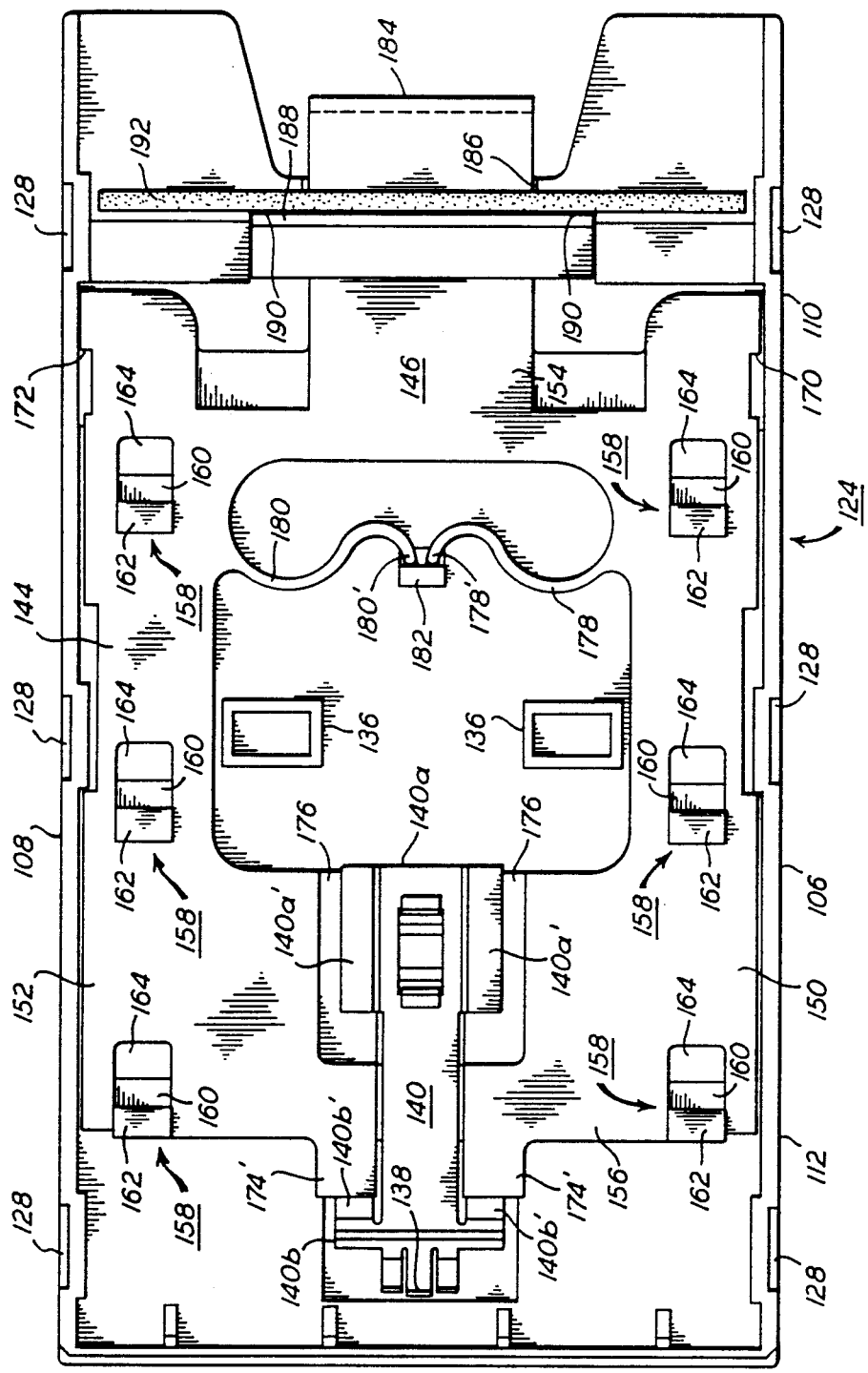
FIG. 10 is a top-plan view of the film holder of FIGS. 8-9, with upper components thereof removed to reveal details of certain lower components as disposed in respective rest positions.
Figure 11:
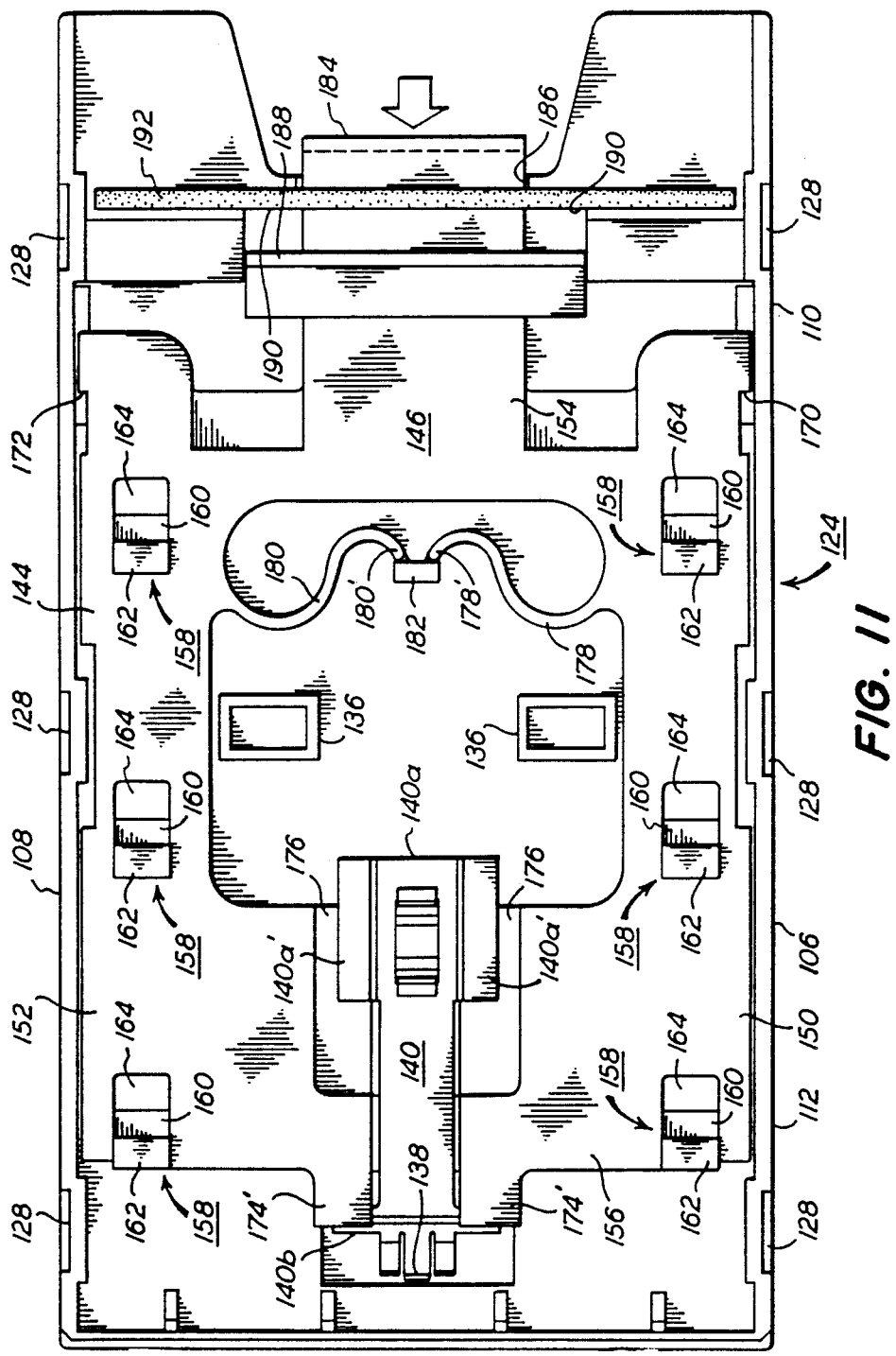
FIG. 11 is a top-plan view similar to FIG. 10 but showing the same lower components as moved to their fully actuated positions.

The aforementioned biasing means normally urging slider 144 in the first direction to its rest position shown in FIG. 10 comprises a pair of S-shaped cantilever springs 178 and 180 that extend transversely from lateral portions 150 and 152, respectively, toward each other, with their free ends 178' and 180' trapped by a flanged tab 182 centrally disposed on rear wall 104.

To facilitate the aforementioned manual movement of slider 144 in the second direction away from its rest position (see arrow in FIG. 11), the slider is provided with externally accessible means, including an L-shaped handle 184, that extends from first end portion 154 through a passageway 186 in housing first end region 110 adjacent to access opening 118.

To limit slider return movement (by springs 178 and 180) in the first direction, and thereby define its rest position, the slider includes a transversely disposed stopping member 188 that abuts opposing surfaces 190, which project from rear wall 104 at opposite sides of passageway 186, when the rest position is reached.

The stopping member also coacts with a transversely disposed, pliant, light-sealing element 192, to help prevent light from entering the holder housing through passageway 186 when the slider is in its rest position. Element 192 extends from passageway 186, into access opening 118, and into the movement path 120, so as to contact film packet P and thereby help prevent light from entering the housing through the access opening.

Operation of holder H in use with packet P will now be described.

Figure 12:
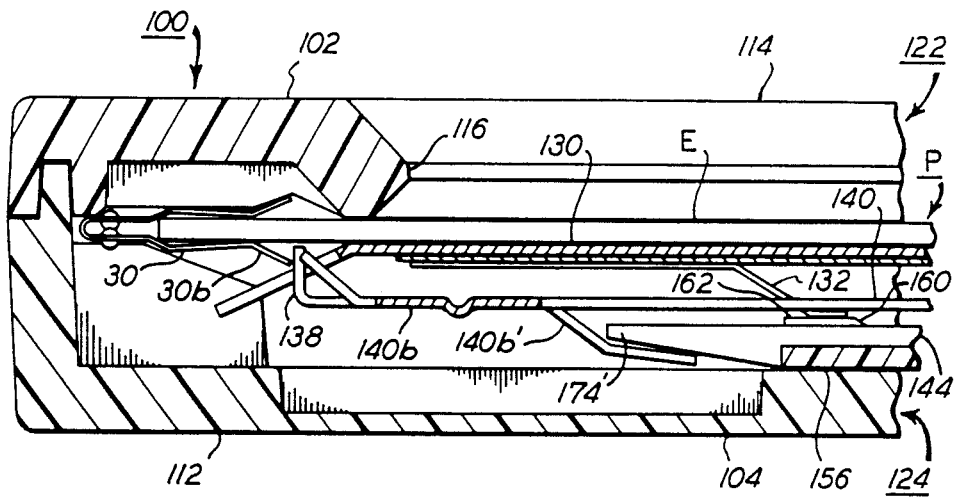
FIGS. 12 and 13 are partial cross-sectional elevations showing an end region of the film holder as taken along line 12/13—12/13 in FIG. 8, FIG. 12 depicting operative components disposed in respective rest positions with a film packet locked thereby in a seated position, FIG. 13 illustrating the same components in their actuated positions with the film packet thus released and moving away from the seated position.
Figure 13:
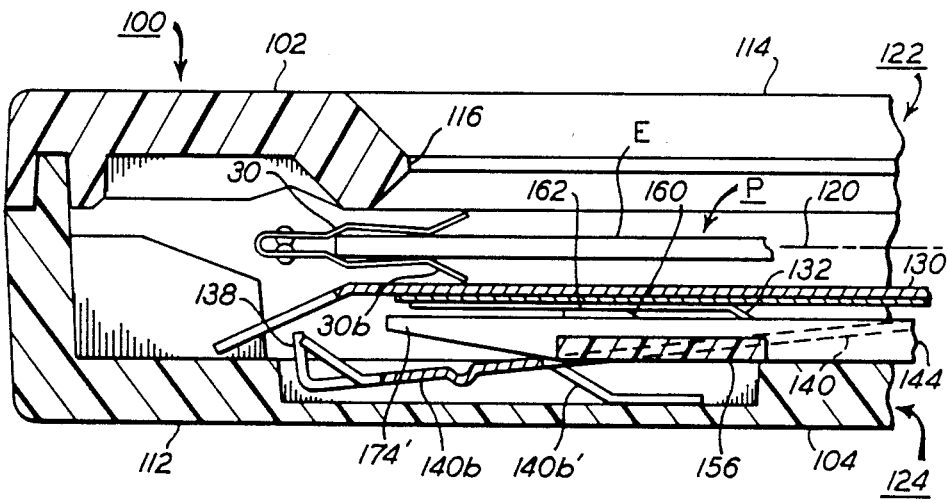

When slider 144 is in its rest position (shown in FIG. 10), spring elements 132, which depend angularly from plate 130, are in resilient engagement with projections 162 on the slider, and thereby provide the biasing influence that urges the plate toward the movement path so as to press packet P (when in its seated position) against front wall frame portion 114. Also, as shown in FIG. 12, spring legs 140b', which depend angularly from free end portion 140b of spring element 140, are engaged by tapered tab portions 174' on the slider, while free end portion 140b resiliently supports blocking member 138 in its position blocking the packet light-locking element 30. Also, as shown in FIG. 14, spring legs 142d, which depend from torsion spring 142b of blocking member 142, are disposed in engageable relation with, but not yet engaged by, ears 170 and 172 on the slider, while torsion spring 142b maintains blocking member elements 142a in their movement-path positions for engagement by the packet movement-limiting stop strip 66 or 68 then facing front wall 102.

Now, when slider 144 is moved from its rest position to its fully actuated position (shown in FIG. 11), by pushing handle 184 inwardly (see FIG. 11 arrow) against the biasing influence of springs 178 and 180, the above-described negating means is actuated to effect its intended functions. The slider projections 162 are thus moved out of engagement with spring elements 132, which in turn follow ramps 160 downwardly (as viewed in FIGS. 14 and 15) into depressions 164. That action negates the biasing influence that urged plate 130 toward the movement path. Also, the slider tapered tab portions 174' are moved into further engagement with spring legs 140b' so as to cam them downwardly (as viewed in FIGS. 12 and 13), against the biasing influence of spring element 140, and thereby move blocking member 138 downwardly away from the movement path. Also, the slider ears 170 and 172 are moved into engagement with spring legs 142d so as to pivot them clockwise (as viewed in FIGS. 14 and 15), against the biasing influence of torsion spring 142b, and thereby pivot blocking member elements 142a clockwise (upwardly) out of the movement path. It will thus be seen that, by a single actuation of handle 184, the pressure-applying plate 130 and both blocking members 138 and 142 are moved away from the movement path, thereby permitting unrestricted movement of the film packet into and out of the holder.

Upon releasing handle 184, the slider is returned to its rest position by springs 178 and 180, causing the foregoing actions to be reversed and the pressure-applying plate and blocking members to be restored to their described film-path positions.

A significant advantage of this holder is that a film packet may easily be inserted into and withdrawn from it whether or not the holder is mounted on a camera back.

The film packet P is normally supplied by the manufacturer with its envelope graspable zone 62 adhered to its carrier sheet tab 24 via its tape adhesive surface 26, so as to prevent unintended relative movement between the envelope and carrier sheet during shipment, storage, and/or handling.

To use the packet with holder H, first the packet side labeled "A" in FIGS. 1 and 3 should be oriented to face the holder film-exposure window 116. Then, with slider handle 184 depressed to actuate slider 144, the packet should be inserted through access opening 118 until it reaches its seated position. Now, with handle 184 released and the holder mounted on a camera back, with its window 116 facing the camera lens, the packet envelope should be grasped at its graspable zone 64 (labeled ① in FIGS. 1–3) and pulled outwardly with sufficient force to overcome the adherence provided by its tape adhesive surface 26. The envelope should then be withdrawn until it is stopped by engagement of its stop strip with blocking member elements 142a in the movement path, while the carrier and film sheets are retained in their seated position by engagement of light-locking element 30 with blocking member 138 in the movement path. The film sheet F is thus uncovered and ready for a photographic exposure via the camera shutter and lens.

After that exposure, the envelope should again be grasped at zone 64 (again, ① in FIGS. 1–3) and pushed in to its seated position, thereby re-covering the now-exposed film sheet. Then, with handle 184 again depressed to actuate slider 144, to thereby release the packet for unrestricted withdrawal, the envelope should be grasped at zone 62 (labeled ② in FIGS. 1–3), to re-adhere that zone to tab 24 via tape adhesive surfaces 26, and the whole packet thus pulled out of the holder. The packet may then be turned over so that its side labeled "B" in FIG. 5 faces the holder window 116, and the foregoing steps repeated to effect a photographic exposure of the other film sheet F'.

With both film sheets now exposed and safely re-covered by the envelope and light-locking element 30, the envelope again becomes re-adhered to the carrier sheet tab when the packet is once again grasped at zone 62 (labeled ② in FIG. 5) and removed from the holder. With the adherence provided by tape adhesive surface 26, the packet may be safely handled, stored, and/or transported without risk of unintended film exposure resulting from separation of the envelope from element 30.

The present invention has now been described in detail with particular reference to its preferred embodiment as illustrated herein. It will be understood, however, that variations and modifications can be effected within the spirit and scope of this invention.

We claim:

1. A photographic film assemblage comprising:
   a photosensitive film sheet having leading and trailing ends;
   an elongate carrier sheet having first and second outward-facing surfaces, said carrier sheet including leading and trailing end sections and an intermediate section between said end sections, said film sheet being detachably attached to said first outward-facing surface of said intermediate section with said leading and trailing ends thereof oriented toward said leading and trailing end sections respectively, said leading end section extending longitudinally beyond said intermediate section and terminating in a tab, said trailing end section extending longitudinally beyond said intermediate section and having a transversely disposed element secured thereto; and
   a light-shielding envelope removably enclosing said carrier sheet and said film sheet, said envelope having first and second inward-facing surfaces overlying said first and second outward-facing surfaces respectively, said envelope including longitudinally extending leading and trailing end portions overlying said leading and trailing end sections respectively, said leading end portion being sealed closed, said trailing end portion being closable by cooperative engagement with said transversely disposed element, said leading end portion including first and second graspable zones, said first graspable zone overlying said tab so that, when grasped, said first zone is pressed against said tab, said second graspable zone not overlying said tab so that, when grasped, said second zone is not pressed thereagainst;

wherein one of said tab and said first graspable zone has adhesive material thereon so that, when grasped, said first zone becomes adhered, via said adhesive material, to said tab, thereby to prevent unintended relative movement between said envelope and said carrier sheet.

2. A photographic film assemblage as claimed in claim 1 including a second photosensitive film sheet, said second film sheet being detachably attached to said second outward-facing surface of said intermediate section.

3. A photographic film assemblage as claimed in claim 1 wherein said film sheet is detachably attached to said first outward-facing surface of said intermediate section only at one of said leading and trailing ends thereof, to facilitate detaching said film sheet from said carrier sheet.

4. A photographic film assemblage as claimed in claim 3 wherein said one of said leading and trailing ends is said leading end, to facilitate inserting said carrier sheet and said film sheet into said envelope.

5. A photographic film assemblage as claimed in claim 1 wherein said tab is eccentrically disposed, relative to an imaginary longitudinal center line of said carrier sheet, and extends farther from said intermediate section than does any other portion of said leading end section.

6. A photographic film assemblage as claimed in claim 5 wherein said first and second graspable zones are transversely aligned with each other, so that said second zone overlies a region inside said envelope that is longitudinally beyond said any other portion of said leading end section.

7. A photographic film assemblage as claimed in claim 1 wherein said leading end section extends asymmetrically relative to an imaginary longitudinal center line of said carrier sheet, said leading end section having a longer portion thereof, including said tab, disposed at one side of said center line and a shorter portion thereof, not including said tab, disposed at the other side of said center line.

8. A photographic film assemblage as claimed in claim 7 wherein said first and second graspable zones are disposed in transverse alignment with each other, so that said second zone overlies a region inside said envelope that is longitudinally beyond said shorter portion.

9. A photographic film assemblage as claimed in claim 1 wherein said adhesive material is provided by an adhesive surface on tape applied to said one of said tab and said first graspable zone.

10. A photographic film assemblage as claimed in claim 9 wherein said one of said tab and said first graspable zone includes means defining an aperture, and wherein said adhesive surface on said tape overlies said aperture.

11. A photographic film assemblage as claimed in claim 10 wherein said adhesive surface overlying said aperture in said one of said tab and said first graspable zone faces the other of said tab and said first graspable zone.

12. A photographic film assemblage as claimed in claim 11 wherein said one of said tab and said first graspable zone is said tab, and wherein said other of said tab and said first graspable zone is said first graspable zone.

13. A photographic film assemblage as claimed in claim 12 wherein said tape is applied to one of said first and second outward-facing surfaces of said tab so that said adhesive surface overlying said aperture faces an opposing one of said first and second inward-facing surfaces of said first graspable zone.

14. A photographic film assemblage as claimed in claim 13 wherein said one of said first and second outward-facing surfaces of said tab is said first outward-facing surface thereof, and wherein said opposing one of said first and second inward-facing surfaces of said first graspable zone is said second inward-facing surface thereof.

* * * * *